United States Patent
Duffie et al.

(10) Patent No.: US 6,594,343 B1
(45) Date of Patent: Jul. 15, 2003

(54) SPLITTER BYPASS ARCHITECTURE FOR TESTING MULTIPLE PORTS

(75) Inventors: P. Kingston Duffie, Palo Alto, CA (US); Jayant Ragde, Sunnyvale, CA (US); Wojtek Antoszkiewicz, Sunnyvale, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 18 days.

(21) Appl. No.: 09/843,020

(22) Filed: Apr. 25, 2001

Related U.S. Application Data

(60) Provisional application No. 60/243,197, filed on Oct. 24, 2000.

(51) Int. Cl.[7] .................... H04M 1/24; H04M 3/08; H04M 3/22
(52) U.S. Cl. .................. 379/1.01; 379/9; 379/27.06; 379/29.01
(58) Field of Search ................ 379/1.01, 1.03, 379/1.04, 9, 15.01, 12, 16, 27.01, 29.01, 32.02, 27.06

(56) References Cited

U.S. PATENT DOCUMENTS

| | | | | |
|---|---|---|---|---|
| 6,181,775 B1 | * | 1/2001 | Bella | 379/29 |
| 6,278,769 B1 | * | 8/2001 | Bella | 379/29.11 |
| 6,404,763 B1 | * | 6/2002 | Renucci et al. | 370/352 |
| 6,466,573 B1 | * | 10/2002 | Renucci | 370/352 |
| 6,477,249 B1 | * | 11/2002 | Williamson et al. | 379/399.01 |
| 6,480,575 B2 | * | 11/2002 | Chea, Jr. et al. | 379/9 |
| 6,512,762 B1 | * | 1/2003 | Renucci et al. | 370/352 |
| 6,535,581 B2 | * | 3/2003 | Singaliese | 379/29.01 |
| 2002/0122539 A1 | * | 9/2002 | Chea, Jr. et al. | 379/27.01 |

* cited by examiner

*Primary Examiner*—Binh Tieu
(74) *Attorney, Agent, or Firm*—Pillsbury Winthrop LLP

(57) ABSTRACT

The invention described herein relates to a splitter bypass system and method for monitoring, testing and maintaining copper loops and lines. Switching devices are implemented in the present invention to bypass a low pass filter and/or a high pass filter in the splitter, thereby actuating bypass functions to bypass a splitter or portions thereof for enabling pure metallic access to the loop, digital equipment, voice equipment, and/or test equipment. The splitter bypass function can be used with a conventional splitter in the current voice and digital system. The splitter bypass operation includes selecting a copper loop or portions thereof for monitoring, testing and maintenance.

19 Claims, 7 Drawing Sheets

SPLITTER BYPASS ARCHITECTURE FOR TESTING MULTIPLE PORTS

CROSS-REFERENCE TO RELATED APPLICATION

This application is based on, and claims priority under 35 U.S.C. Section 120, from U.S. Provisional Application No. 60/243,197 filed on Oct. 24, 2000.

FIELD OF THE INVENTION

The present invention relates to a splitter bypass system and method for monitoring, testing and maintaining copper loops and lines. More particularly, the present invention is directed to a system and method for actuating bypass functions to bypass a splitter or portions thereof for enabling pure metallic access to the loop, digital equipment, voice equipment, and/or test equipment. Switching devices are implemented in the present invention to bypass a low pass filter and/or a high pass filter in the splitter.

BACKGROUND OF THE INVENTION

In the telecommunications industry, Plain Old Telephone Service (POTS) or voice services are ubiquitous. As is well known, POTS is analog in nature and is implemented over copper loops. Class 5 switches generally provide this type of service and lines or copper loops are used to connect the. Class 5 switch to the customer premise.

FIG. 1A illustrates a conventional system implementing POTS. The system includes a central office (CO) having a voice switch such as a Class 5 switch 2 connected to a telephone 4 in a customer premise. As known, the Class 5 switch 2 is connected to the telephone 4 via a local loop 6.

POTS typically requires a battery voltage on the copper loop 6. The battery voltage is used for signaling, and this type of loop is known as a "wet" loop. For detecting faults/problems or for routine testing, the copper loop 6 connecting the Class 5 switch 2 to the customer premise is tested using test equipment 8 having pure metallic access to the loop 6, as illustrated in FIG. 1B. Pure metallic test access allows accurate testing on the copper loop 6 and is implemented through the Class 5 switch 2.

Recently, the need for increased bandwidth has resulted in the emergence of digital services on the existing copper loops. These emerging digital service use non-voice frequency bandwidth. This has placed increased requirements on the copper loops to provide the digital services. As can be expected, some of the loop design rules used to deploy voice only services are no longer valid when digital services are added. Many of these digital services have been provided on "dry" copper, loops (i.e., loops without battery voltage), providing a data only circuit.

In 1999, the Federal Communications Commission (FCC) adopted rules to promote competition between local telephone companies and providers of high speed data services by directing the local telephone companies to share their telephone lines with such providers. With these rules, many companies can deploy new technologies on a faster, more cost-effective basis, thereby allowing residential and business customers to access broadband and POTS services from a choice of different providers.

Digital Subscriber Line or xDSL is one of the most promising new technologies for delivering superior service and higher speed connections over existing infrastructure. In addition, the growing demand for faster, more reliable Internet access has increased the demand for technologies that deliver higher speed connections over existing infrastructure. As known, different competing forms of digital subscriber line technologies are collectively designated as xDSL technologies with the "x" representing various one or more letter combinations, which are used in front of the "DSL" acronym to designate the type of technology being used. Some of the more prevalent xDSL technologies include HDSL, ADSL, SDSL, RADSL, VADSL, and VDSL. xDSL uses the existing copper loop that is traditionally used for conventional telephony to deliver data at high bandwidth.

Currently, the transmission rates for xDSL technologies are dependent on factors such as the distance between the central office and a particular customer, etc. Also, xDSL uses packet switching technology that operates independently of the voice telephone system, allowing telephone companies to provide Internet service and not lock up circuits for telephone calls. The copper loop can carry both voice and data signals simultaneously, in both directions, allowing the customer to log onto the. Internet and make a telephone call at the same time. Thus, it is easy to understand why xDSL is becoming the preferred system and method for sending/receiving analog and digital data/signals in the telecommunications industry.

The FCC line sharing ruling, along with the need to maximize the utilization of copper pairs, has brought about larger deployment of both voice and digital (data) services on the same copper loop. This has introduced the concept of a splitter in the local loop environment. The function of the splitter is to segregate the low frequency (voice) and high frequency (data) to the appropriate equipment. These splitters allow the voice equipment (e.g., Class 5 switches) and digital equipment (generally referred to as Digital Subscriber Loop Access Multiplexers or DSLAMs) to provide service simultaneously to a single subscriber.

FIG. 2 illustrates a simplified diagram of a conventional system implementing both voice and digital services. In the conventional system, the central office (CO) is connected to the customer's telephone 4 and a computing device 10 or similar unit at the customer's premise (home, office, etc.) using the copper loop 6. In the CO, the Class 5 switch 2 and a DSLAM 12 are connected to a CO splitter 20. As known, the Class 5 switch 2 includes circuitry for providing POTS (voice) service and the DSLAM 12 includes circuitry for providing digital service to the customer.

In greater detail, the CO splitter 20 is used to isolate the voice service from the digital service, or stated alternatively, to segregate low frequency (e.g., voice) and high frequency (e.g., data) to the appropriate equipment. The isolation generated by the CO splitter 20 is important for minimizing interference between the two types of services. The CO splitter 20 separates voice and data band signals received from the copper loop 6 and provides the respective signals to the Class 5 switch 2 and the DSLAM 12. The CO splitter 20 also combines the voice and data band signals received from the Class 5 switch 2 and the DSLAM 12 and provides the combined signals to the copper loop 6. The CO splitter 20 allows the voice equipment (Class 5 switch 2) and the digital equipment (DSLAM 12) to provide service simultaneously to a single subscriber.

The CO splitter 20 includes a low pass filter (LPF) 22 connected to the Class 5 switch 2 and a high pass filter (HPF) 24 connected to the DSLAM 12. The LPF 22 filters out higher band digital signals and prevents such signals from interfering with the Class 5 switch 2. Likewise, the HPF 24 filters out low band voice signals and prevents such signals from interfering with the DSLAM 12. In other words, the high frequency signals generated by the DSLAM 12 will not interfere with the Class 5 switch 2 because of the presence of the LPF 22, and the low frequency signals generated by the Class 5 switch 2 will not interfere with the DSLAM 12 because of the presence of the HPF 24.

A second remote (RT) splitter 30 having a LPF 32 and HPF 34 can be optionally installed at the customer's premise based on the type of xDSL service. The LPF 32 is connected to the telephone 4 for filtering out high band signals, while the HPF 34 is connected to the computing device 10 for filtering out low band signals.

Again, FIG. 2 illustrates an overlay configuration where digital services are added on top of the existing voice services. As a result of this configuration, complexity and problems result in the deployment and testing of the system. As described above, testing from the voice equipment is performed with metallic access to the loop 6. With the introduction of the CO splitter 20, pure metallic access is lost. Access to the loop 6 is through the LPF 22, and the voice equipment is no longer the last element in the circuit looking out from the central office. In other words, the CO splitter 20 is now the last central office element, which is connected to both voice and digital equipment.

Additional problems arise between the DSLAM 12 and the CO splitter 20 and between the Class 5 switch 2 and the CO splitter 20. For example, there, is no provision for testing and isolation of problems in this configuration.

In more detail, introducing the CO splitter 20 in the system has the following testing disadvantages: (1) true or pure metallic access to the copper loop 6 is no longer available (see (A) in the FIG. 2), which limits the testing to low frequency testing through the LPF 22; (2) there is no pure access to the metallic connection between the Class 5 switch 2 and the CO splitter 20 (see (B) in the FIG. 2) to isolate wiring or other problems; (3) there is no pure access to the metallic connection between the DSLAM 12 and the CO splitter 20 (see (C) in the FIG. 2) to isolate wiring or other problems; and (4) there is no pure metallic testing capability from the DSLAM 12.

Deployment of digital services introduces various new requirements on the copper loop that are contrary to the design rules for voice only services. Loop qualification and testing become more important in this environment. As xDSL services are more widely deployed through splitters, testing capabilities become critical to ensure widespread deployment. The present invention is intended to overcome these problems of the prior art.

SUMMARY OF THE INVENTION

In view of the above-described problems of the prior art, it is an object of the present invention to provide a splitter bypass system and method.

It is another object of the present invention to provide a system and method for implementing a splitter bypass function in the existing infrastructure for improved monitoring, testing and maintenance.

It is yet another object of the present invention to provide a splitter bypass system and method for accessing the copper loop for monitoring, testing and maintenance with minimal interference and disturbance to the existing POTS services on the loop.

It is a further object of the present invention to provide a system and method for providing a reliable and effective manner for monitoring, testing and maintaining a copper loop in the voice and digital environments.

These and other objects of the present invention are obtained by providing a splitter bypass function that can be used with a conventional splitter in the current voice and digital system. The splitter bypass function is used for monitoring, testing and maintaining a copper loop. The splitter bypass operation includes the steps of selecting a copper loop or portions thereof for testing. Switching devices are introduced to bypass a low pass filter and/or a high pass filter in the splitter.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PRESENT INVENTION

Figure 1A:
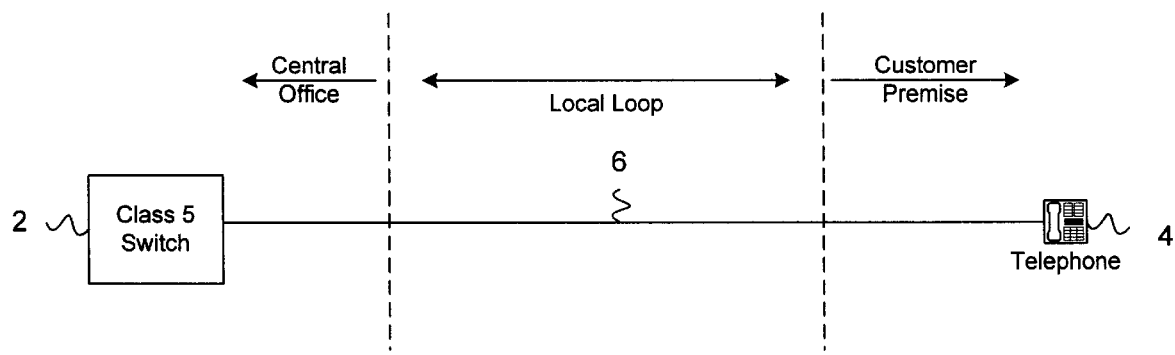
FIG. 1A illustrates a conventional system implementing POTS.
Figure 1B:
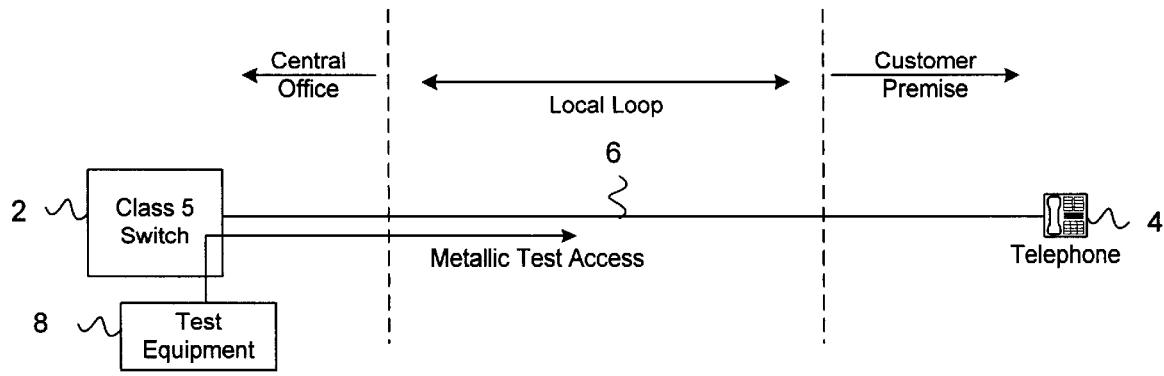
FIG. 1B illustrates a diagram of FIG. 1A having test equipment.
Figure 2:
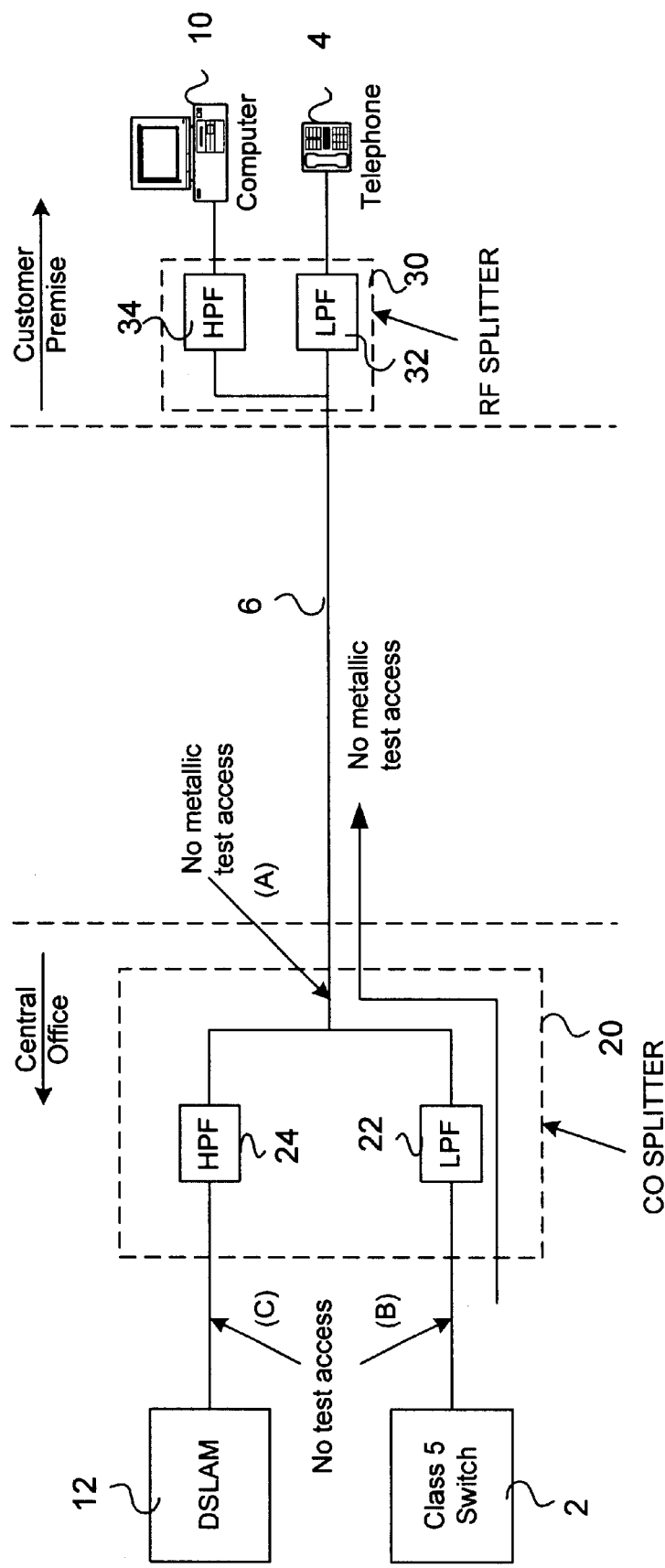
FIG. 2 illustrates a simplified diagram of a conventional system implementing both voice and digital services.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 3–9, wherein like components and steps are designated by like reference numerals throughout the various figures. Further, specific parameters are provided herein, and are intended to be explanatory rather than limiting.

The present invention is directed to a splitter bypass architecture for testing multiple ports for monitoring, testing, and maintaining copper loops in voice and digital environments. As described above, pure metallic access to the copper loops and lines are essential for monitoring, testing and maintaining proper service to customers in both voice and digital services. Switching devices are implemented to bypass the LPF and/or HPF associated with a splitter to enable pure metallic access to/from the loop, voice port, digital port, and test equipment or other external equipment.

Figure 3:
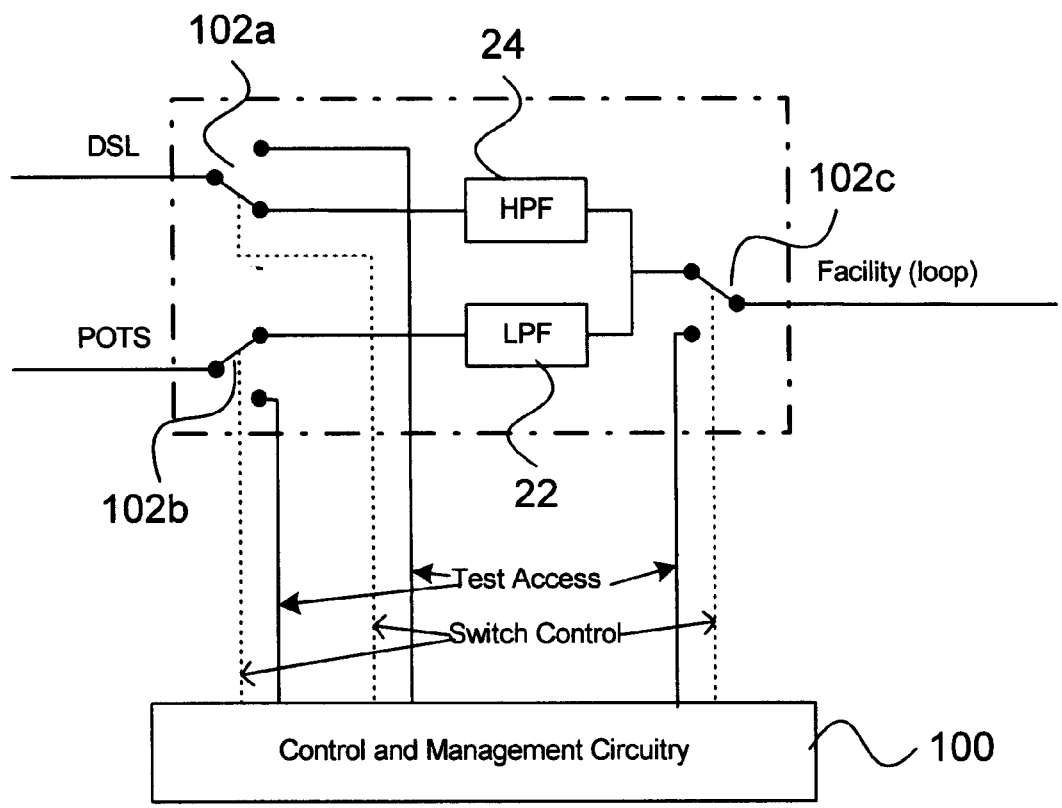
FIG. 3 illustrates a system for providing pure metallic access in accordance with the present invention.

FIG. 3 illustrates a system for providing pure metallic access in accordance with the present invention. A control and management device/circuitry 100 and switching devices 102a, 102b, 102c are implemented in the present invention to enable pure metallic access to the loops and lines. For example, the switching devices 102a, 102b, 102c can be used to provide (pure metallic access to the loop from the test equipment or external equipment, (2) pure metallic access to the line between the between CO splitter and POTS/voice equipment, (3) pure metallic access to the line between the between CO splitter and DSLAM/digital equipment, (4) pure metallic access to the loop from the POTS/voice equipment, and (5) pure metallic access to the loop from the Rio DSLAM/digital equipment. Monitoring can be performed during conditions described in (4) and (5). These modes of pure metallic access and monitoring will be described in greater detail hereinafter. In addition, the switching devices 102a, 102b, 102c can be designed within the existing splitter to create a novel "smart splitter" that is implemented in the present invention. Alternatively, the switching devices 102a, 102b, 102c can be external to the existing splitter so long as it can provide the functionalities described herein.

The present invention can be used to isolate the CO splitter functionality and provide direct access to at least three ingress points (via switching devices 102a, 102b, 102c) on the CO splitter. The configuration illustrated in FIG. 3 shows the default or normal mode of operation, and the switching devices 102a, 102b, 102c are in the "normal" modes. The switching devices 102a, 102b, 102c are controlled by switch control commands (dashed lines) originating from the control and management device 100, which device includes control logic to manage and control the operation of the switching devices 102a, 102b, 102c and any access to/from the external test equipment.

Figure 4:
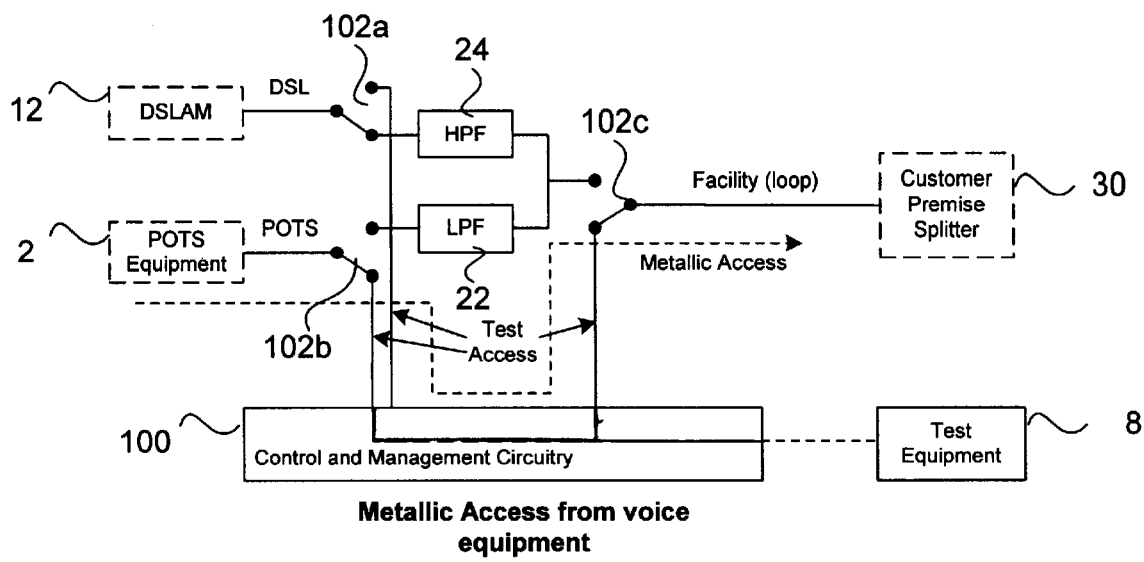
FIG. 4 illustrates architecture providing pure metallic access to the loop from the POTS/voice equipment in accordance with the present invention.

FIG. 4 illustrates architecture providing pure metallic access to the loop from the POTS/voice equipment in accordance with the present invention. In this configuration, the switching devices 102b, 102c are switched from their normal modes to "testing" modes, while the switching device 102a remains in its normal mode. In this mariner, the test equipment 8 via the control and management device 100 can be used for loop qualification, troubleshooting, and monitoring the voice portion of the loop. The loop qualification can be performed from the POTS/voice equipment 2 in the central office. The external test equipment 8 can monitor/check the loop status.

When monitoring the loop, the configuration of FIG. 4 allows the test equipment to determine whether voice traffic is present. If voice traffic is present during the monitoring mode, testing is voided to avoid interference to the voice service. However, if voice traffic is not present during the monitoring mode, pure metallic access or testing of the loop can be performed as discussed herein (illustrated in FIG. 5). During the monitoring mode, it is important to not drop or interfere with the existing voice service.

Figure 5:
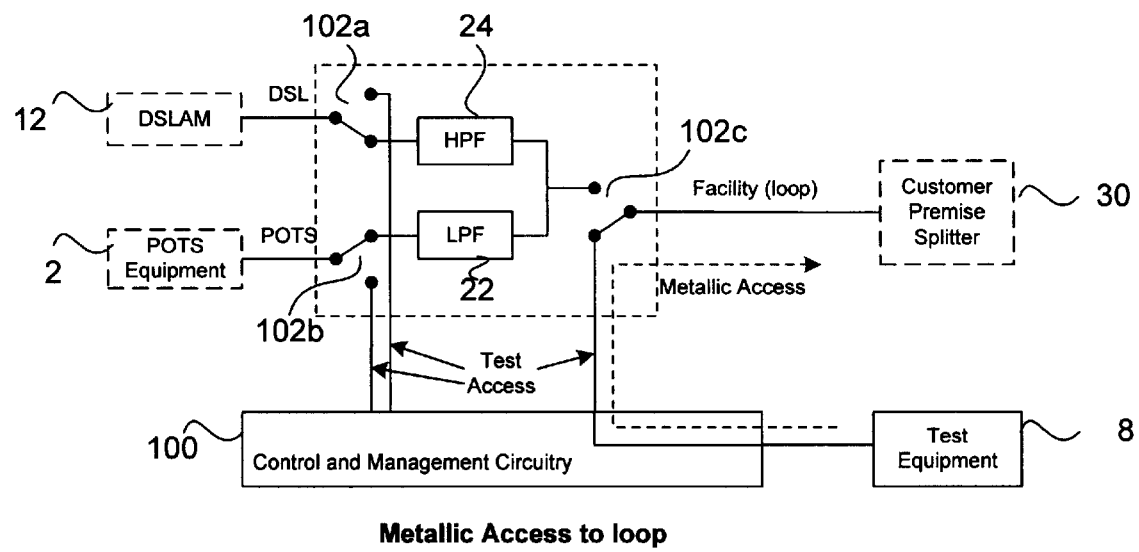
FIG. 5 illustrates architecture providing pure metallic access to the loop from the test equipment in accordance with the present invention.

FIG. 5 illustrates architecture providing pure, metallic access to the loop from the test equipment in accordance with the present invention. In this configuration, the switching device 102c is switched to its testing mode, while the switching devices 102a, 102b remain in their normal mode. The test equipment 8 then has pure metallic access to the loop since the LPF 22 and HPF 24 are bypassed (i.e., the splitter circuit is disabled), and loop qualification and loop troubleshooting applications can be performed in this configuration.

Figure 6:
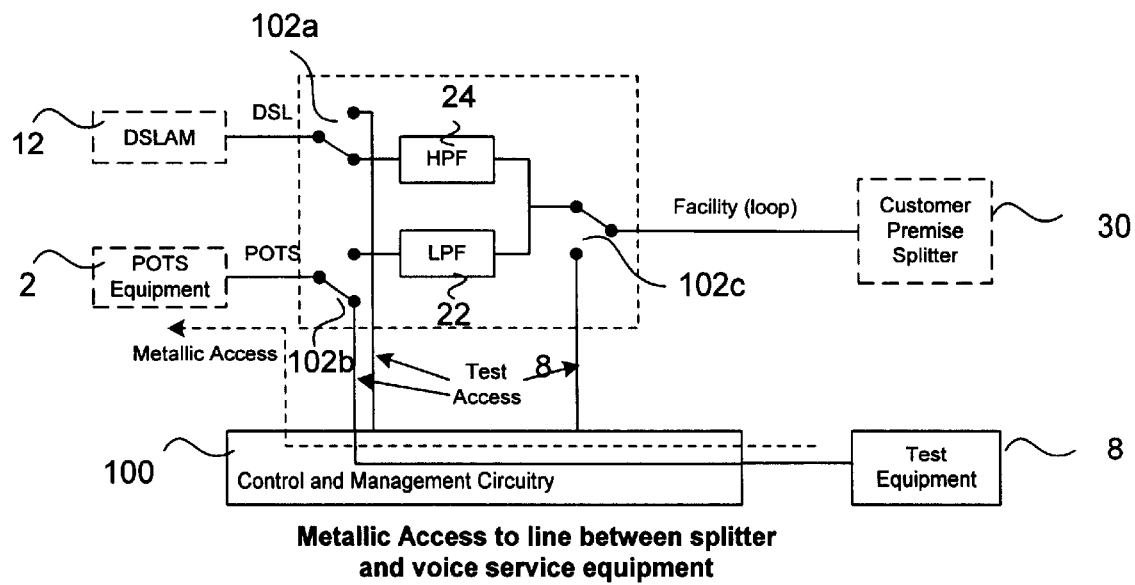
FIG. 6 illustrates architecture providing pure metallic access to a line between the splitter and POTS/voice equipment in accordance with the present invention.

FIG. 6 illustrates architecture providing pure metallic access to a line between the splitter and POTS/voice equipment in accordance with the present invention. In this configuration, the test equipment 8 has pure metallic access to the line between the CO splitter and the POTS/voice equipment 2. The switching device 102b is switched to its testing mode, while the switching devices 102a, 102c are in their normal mode. This configuration is useful in troubleshooting central office cabling faults, in verifying connection to the correct port on the POTS/voice equipment 2 and verifying the service provided by the.POTS/voice equipment 2.

Figure 7:
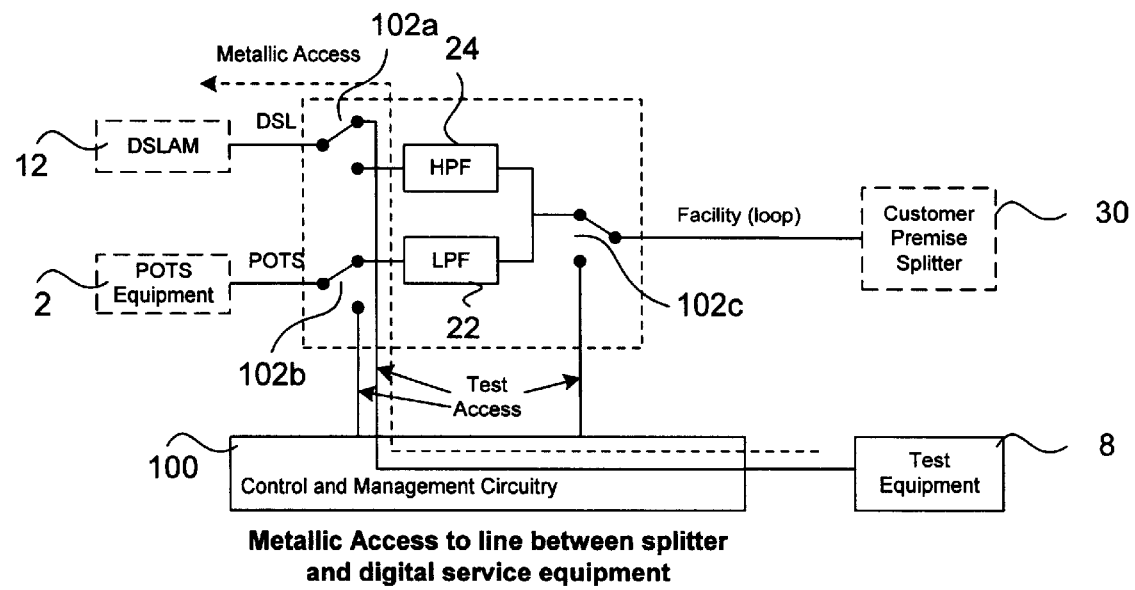
FIG. 7 illustrates architecture providing pure metallic access to a line between the splitter and DSLAM/digital equipment in accordance with the present invention.

FIG. 7 illustrates architecture providing pure metallic access to a line between the splitter and DSLAM/digital equipment in accordance with the present invention. In this configuration, the test equipment 8 has pure metallic access to the line between the CO splitter and the DSLAM/digital equipment 12. Pure metallic access is provided to the line from the DSLAM/digital equipment 12 by switching the switching device 102a to its testing mode, while leaving the switching devices 102b, 102c in their normal mode. This configuration is used for troubleshooting central office cabling faults, verifying connection to the correct port on the DSLAM/digital equipment 12 and verifying that the DSLAM/digital equipment 12 is providing the correct service.

Figure 8:
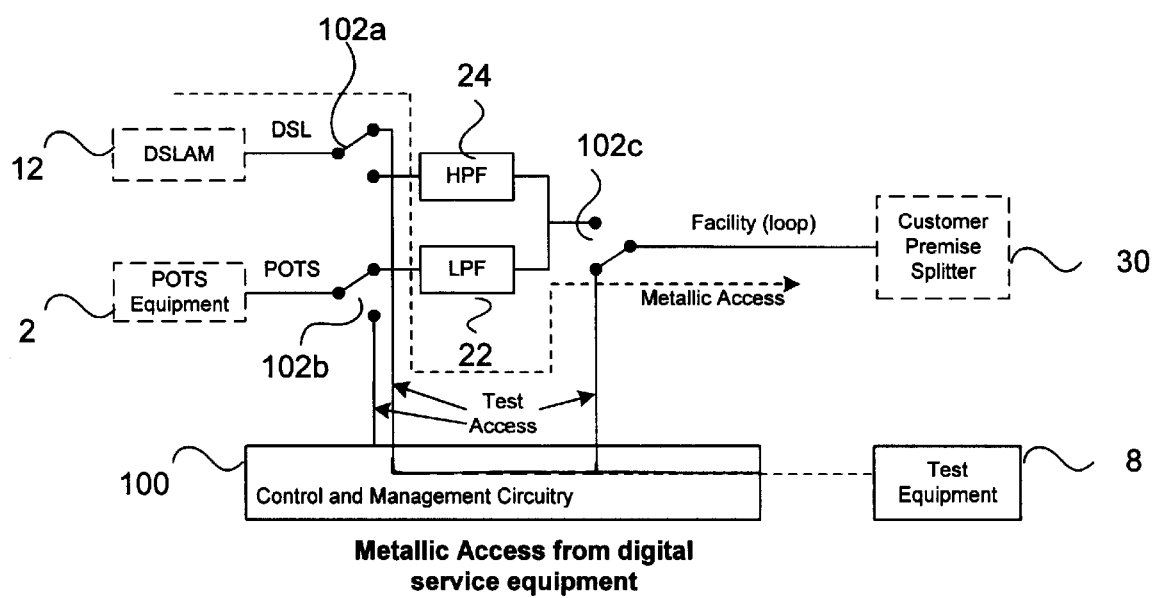
FIG. 8 illustrates an architecture providing pure metallic access to a line from DSLAM/digital equipment in accordance with the present invention.

FIG. 8 illustrates architecture providing metallic access to a line from digital service/DSLAM equipment in accordance with the present invention. In this configuration, the switching devices 102a, 102c are switched to the testing mode while the switching device 102b remains in its normal mode. This configuration allows monitoring of the DSL service, where higher level protocol analysis can be performed.

Figure 9:
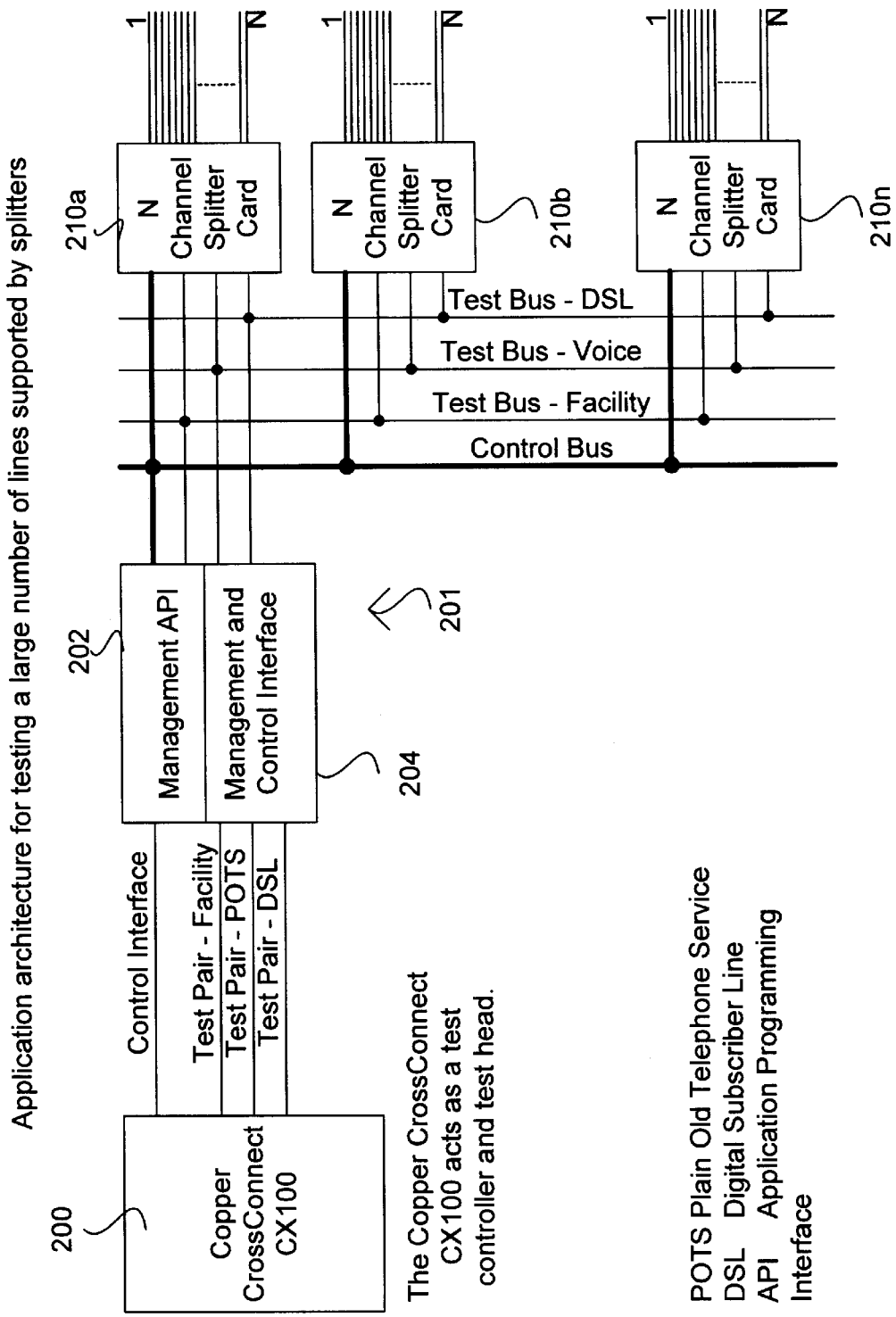
FIG. 9 illustrates architecture for testing a large number of lines supported by splitters in accordance with the present invention.

FIG. 9 illustrates architecture for testing a large number of lines supported by splitters in accordance with the present invention. This configuration also provides a very scalable architecture for testing a large number of lines. A processing device 201, which is included in the control and management device 100, includes a management API 202 (application programming interface) and a management and control interface 204. A control bus is coupled to the processing device 201 and n number of splitter line cards 210a, 210b, 210c. Each splitter line card 210a, 210b, ... 21 On can support N number of splitters. The processing device 201 further communicates with the splitter line cards 210a, 210b, ... 210n through a facility test bus, a voice test bus, and a digital (DSL) test bus, as illustrated in FIG. 9.

A cross connect unit 200 such as the CX100 Copper CrossConnect System, from Turnstone Systems, Inc. can be used in the present invention as illustrated in FIG. 9. The CX100 Copper CrossConnect System is a platform that automates the physical layer infrastructure in the CO, enabling ILECs and CLECs to remotely control, test, and manage the copper loop. Additional information regarding. Turnstone System's CX100 Copper CrossConnect System can be found at the web site www.turnstone.com, which is contents are herein incorporated by reference. It is also noted that other units providing similar functionalities as the CX100 Copper CrossConnect System can be implemented in the present invention. The cross connect unit 200 communicates with the processing device 201 through several buses: control interface; test pair (facility); test pair (POTS); and test pair (DSL). The cross connect unit 200 can also be used as a test controller and a test head for testing the various lines and, loops described herein.

In other embodiments, other components can be substituted for the specific components described herein so long as these components: perform essentially identical functions as described herein. In the previous descriptions, numerous specific details are set forth, such as specific finctions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A system for bypassing a low pass filter and/or a high pass filter in a splitter for enabling pure metallic access to a loop, digital equipment, a voice equipment, and/or a test equipment, the system comprising:

a first switching device connected to the digital equipment and one of the high pass filter or a control logic, wherein the first switching device is adapted to be switched to connect the digital equipment between the high pass filter and the control logic;

a second switching device connected to the voice equipment and one of the low pass filter or the control logic, wherein the second switching device is different from the first switching device and adapted to be switched to connect the voice equipment between the low pass filter and the control logic, and wherein the voice equipment is located in a central office; and a third switching device connected to the loop and either the filters or the control logic, wherein the third switching device is different from either the first and second switching devices and adapted to be switched to connect the loop between the filters and the control logic.

2. A system according to claim 1, wherein pure metallic access to the loop from the voice equipment is obtained when the second and third switching devices connect the voice equipment and the loop, respectively, to the control logic.

3. A system according to claim 1 further comprising the test equipment coupled to the control logic.

4. A system according to claim 3, wherein pure metallic access to the loop from the test equipment is obtained when the third switching device connects the loop to the control logic.

5. A system according to claim 1, wherein pure metallic access to a voice line between the splitter and the voice equipment is obtained when the second switching device connects the voice equipment to the control logic.

6. A system according to claim 1, wherein pure metallic access to a digital line between the splitter and the digital equipment is obtained when the first switching device connects the digital equipment to the control logic.

7. A system according to claim 1, wherein pure metallic access to the loop from the digital equipment is obtained when the first and third switching devices connect the digital equipment and the loop, respectively, to the control logic.

8. A system according to claim 1, wherein the control logic comprises a management application programming interface (API) and a management and control interface.

9. A system According to claim 1, wherein the first, second, and third switching devices are positioned internally within the splitter.

10. A system for bypassing a low pass filter and/or a high pass filter in a splitter for enabling pure metallic access to a loop, digital equipment, a voice equipment, and/or a test equipment, the system comprising:

a first switching means for switching the connection of the digital equipment from the high pass filter to a control logic;

a second switching means for switching the connection of the voice equipment from the low pass filter to the control logic, wherein the voice equipment is located in a central office; and a third switching means for switching the connection of the loop from both the filters to the control logic, wherein the third switching mean is different from either the first and second switching means.

11. A system according to claim 10, wherein pure metallic access to the loop from the voice equipment is enabled when the second and third switching means connect the voice equipment and the loop, respectively, to the control logic.

12. A system according to claim 10 further comprising means for coupling the test equipment to the control logic.

13. A system according to claim 12, wherein pure metallic access to the loop from the test equipment is enabled when the third switching means connects the loop to the control logic.

14. A system according to claim 10, wherein pure metallic access to a voice line between the splitter and the voice equipment is enabled when the second switching means connects the voice equipment to the control logic.

15. A system according to claim 10, wherein pure metallic access to a digital line between the splitter and the digital equipment is enabled when the first switching means connects the digital equipment to the control logic.

16. A system according to claim 10, wherein pure metallic access to the loop from the digital equipment is enabled when the first and third switching means connect the digital equipment and the loop, respectively, to the control logic.

17. A system according to claim 10, wherein the control logic comprises a management application programming interface (API) and a management and control interface.

18. A splitter having a low pass filter for filtering out high digital signals and a high pass filter for filtering out low voice signals, comprising:

a first switching device connecting a digital equipment to the low pass filter and adapted to be switched so that the digital equipment is connected to a control logic;

a second switching device connecting a voice equipment to the high pass filter and adapted to be switched so that the voice equipment is connected to the control logic, wherein the voice equipment is located in a central office; and a third switching device connecting a loop to the filters and adapted to be switched so that the loop is connected to the control logic, wherein the third switching device is different from either the first and second switching devices.

19. A splitter having a low pass filter for filtering out high digital signals to/from a voice equipment and a high pass filter for filtering out low voice signals to/from a digital equipment, comprising:

a first switching device connecting the digital equipment to the low pass filter and adapted to be switched so that the digital equipment is connected to a control logic;

a second switching device connecting the voice equipment to the high pass filter and adapted to be switched so that the voice equipment is connected to the control logic, wherein the voice equipment is located in a central office; and a third switching device connecting a loop to the filters and adapted to be switched so that the loop is connected to the control logic, wherein the third switching device is different from either the first and second switching devices.

* * * * *